US012134148B2

(12) United States Patent
Fujiwara et al.

(10) Patent No.: US 12,134,148 B2
(45) Date of Patent: Nov. 5, 2024

(54) JOINING STRUCTURE AND JOINING METHOD

(71) Applicant: Panasonic Intellectual Property Management Co., Ltd., Osaka (JP)

(72) Inventors: Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 447 days.

(21) Appl. No.: 17/671,817

(22) Filed: Feb. 15, 2022

(65) Prior Publication Data

US 2022/0168836 A1 Jun. 2, 2022

Related U.S. Application Data

(63) Continuation of application No. PCT/JP2020/032642, filed on Aug. 28, 2020.

(30) Foreign Application Priority Data

Sep. 5, 2019 (JP) ................................. 2019-162387

(51) Int. Cl.
 *B23K 9/007* (2006.01)
 *B23K 9/02* (2006.01)
 (Continued)

(52) U.S. Cl.
 CPC ............... *B23K 9/007* (2013.01); *B23K 9/02* (2013.01); *B23K 9/173* (2013.01); *B23K 9/23* (2013.01); *Y10T 29/49213* (2015.01)

(58) Field of Classification Search
 CPC .......... B23K 9/007; B23K 9/232; B23K 9/23; B23K 26/323; B23K 2103/18; Y10T 403/477; Y10T 29/49826; Y10T 29/49213
 (Continued)

(56) References Cited

U.S. PATENT DOCUMENTS 3,095,951 A * 7/1963 Rood ..................... B23K 9/007
                                                    219/94
10,850,342 B2 * 12/2020 Inoue ..................... B23K 9/232
 (Continued)

FOREIGN PATENT DOCUMENTS

EP    3 505 289      7/2019
JP    2-76990        3/1990
 (Continued)

OTHER PUBLICATIONS

International Search Report issued Oct. 6, 2020 in International (PCT) Application No. PCT/JP2020/032642.
 (Continued)

*Primary Examiner* — Thiem D Phan
(74) *Attorney, Agent, or Firm* — Wenderoth, Lind & Ponack, L.L.P.

(57) ABSTRACT

A second member has a through-portion penetrating toward a first member. An overlapped surface of the second member with the first member includes a recess. The recess is recessed so as to surround an entire periphery of the through-portion. A sealing material is injected into the recess from an injection hole to close a gap between overlapped surfaces of the first member and the second member.

6 Claims, 6 Drawing Sheets

(51) Int. Cl.
*B23K 9/173* (2006.01)
*B23K 9/23* (2006.01)

(58) Field of Classification Search
USPC .................................. 29/879, 428, 876, 877
See application file for complete search history.

(56) References Cited

U.S. PATENT DOCUMENTS

2019/0101145 A1   4/2019  Fujiwara et al.
2019/0257333 A1   8/2019  Fujiwara et al.
2019/0368524 A1  12/2019  Fujiwara et al.

FOREIGN PATENT DOCUMENTS

WO    2018/030272    2/2018
WO    2018/142994    8/2018

OTHER PUBLICATIONS

Office Action issued Jul. 14, 2023 in corresponding European Application No. 20861857.9.

\* cited by examiner

JOINING STRUCTURE AND JOINING METHOD

CROSS-REFERENCE TO RELATED APPLICATIONS

This is a continuation of International Application No. PCT/JP2020/032642 filed on Aug. 28, 2020, which claims priority to Japanese Patent Application No. 2019-162387 filed on Sep. 5, 2019. The entire disclosures of these applications are incorporated by reference herein.

BACKGROUND

The present invention relates to a joint structure and a joining method.

WO 2018/030272 discloses a joint structure in which a first metal material and a dissimilar material that is difficult to be welded to the first metal material overlap each other, and a filler material (welding wire) is arc-welded through a through-portion of the dissimilar material.

A part of the melted filler material forms a flange so as to cover an upper outer periphery of the through-portion of the dissimilar material. Accordingly, the dissimilar material and the first metal material are fixed to each other by a compressive fixing force between the flange and the first metal material due to solidification shrinkage of the filler material onto the first metal material.

SUMMARY

However, according to the invention of WO 2018/030272, moisture may enter from outside through a gap between overlapped surfaces of the first metal material and a second metal material. Electrolytic corrosion may thus occur in an area where the first metal material and the second metal material overlap each other due to the entry of the moisture, and joint strength between the materials may decrease.

In view of the foregoing, it is an object of the present invention to reduce occurrence of electrolytic corrosion in an area where a metal material and a dissimilar material overlap each other.

An aspect of the present disclosure is directed to a joint structure including a first member made of a metal material, a second member made of a material that is difficult to be welded to the first member, and a third member made of a filler material and welded to the first member, the first member, the second member, and the third member being joined together, and provides a solution as in the following.

That is, in a first aspect of the present disclosure, the second member includes a through-portion penetrating toward the first member;

the third member is welded to the first member through the through-portion;

at least one of overlapped surfaces of the first member and the second member includes a recess formed into a space separate from the through-portion, the recess being recessed so as to surround an entire periphery of the through-portion;

the recess is formed into a space separate from a welded part that is a welding site where the first member and the third member are welded together, the recess being recessed so as to surround an entire periphery of the welded part;

at least one of the first member or the second member includes an injection hole communicating with the recess; and the recess is provided with a sealing material injected from the injection hole, the sealing material closing a gap between the overlapped surfaces of the first member and the second member.

According to the first aspect, at least one of the overlapped surfaces of the first member and the second member includes the recess. The recess is formed into a space separate from the through-portion and is recessed so as to surround the entire periphery of the through-portion of the second member. The recess is formed in a space separate from the welded part, which is a welding site where the first member and the third member are welded together. The recess is recessed so as to surround the entire periphery of the welded part. The recess communicates with the injection hole. The recess is provided with the sealing material injected from the injection hole.

Since the gap between the overlapped surfaces of the first member and the second member is closed with the sealing material in this manner, it is possible to keep moisture from entering from the outside into an area where the first member and the second member overlap each other.

This makes it possible to reduce occurrence of electrolytic corrosion in the area where the first member and the second member overlap each other at the welded part, which is a welding site where the first member and the third member are welded together, and to secure joining strength.

A second aspect is an embodiment of the first aspect. In the second aspect, the injection hole includes a plurality of injection holes, the injection holes being disposed along the recess.

According to the second aspect, the plurality of injection holes are disposed along the recess. This allows the sealing material to spread all around and throughout the recess and improve sealing properties. Further, simultaneously injecting the sealing material from the plurality of the injection holes makes it possible to perform the injection of the sealing material in a short time.

A third aspect is an embodiment of the first or second aspect. In the third aspect, the recess has a width larger than a diameter of the injection hole.

In the third aspect, the width of the recess is larger than the diameter of the injection hole. Consequently, the sealing material injected from the injection hole spreads transversely inside the recess. This allows the sealing material to be installed over an increased area inside the recess, which improves sealing properties.

A fourth aspect is an embodiment of any one of the first to third aspects. In the fourth aspect, the recess is formed in the first member having a smaller plate thickness than the second member, the recess being obtained by plastically deforming the first member into a three-dimensional shape.

This configuration increases the strength of the first member having a smaller plate thickness than the second member.

A fifth aspect of the present disclosure is directed to a joining method for joining together a first member made of a metal material, a second member made of a material that is difficult to be welded to the first member, and a third member made of a filler material and welded to the first member. The second member includes a through-portion penetrating toward the first member;

at least one of overlapped surfaces of the first member and the second member includes a recess formed into a space separate from the through-portion, the recess being recessed so as to surround an entire periphery of the through-portion;

the recess is formed into a space separate from a welded part that is a welding site where the first member and the third member are welded together, the recess being recessed so as to surround an entire periphery of the welded part;

at least one of the first member or the second member includes an injection hole communicating with the recess;

the joining method includes: overlapping the second member on the first member and welding the third member to the first member through the through-portion; and injecting a sealing material into the recess from the injection hole to close a gap between the overlapped surfaces of the first member and the second member with the sealing material.

In the fifth aspect, after the third member is welded to the first member through the through-portion, the sealing material is injected into the recess from the injection hole. The recess is formed into a space separate from the through-portion and is formed into a space separate from the welded part, which is a welding site where the first member and the third member are welded together. The recess is recessed so as to surround the entire peripheries of the welded part and the through-portion.

The sealing material injected after the second member is compressed and fixed by solidification and contraction of the third member on the first member prevents the sealing material from being deformed, or part of the sealing material from evaporating and generating gas, due to heat during welding. This allows the sealing material to spread all around and throughout the recess and improve sealing properties.

This makes it possible to reduce occurrence of electrolytic corrosion in the area where the first member and the second member overlap each other around the welded part, which is a welding site where the first member and the third member are welded together, and to secure joining strength.

A sixth aspect is an embodiment of the fifth aspect. In the sixth aspect, the recess is formed in the first member having a smaller plate thickness than the second member, the recess being obtained by plastically deforming the first member into a three-dimensional shape.

This configuration increases the strength of the first member having a smaller plate thickness than the second member.

According to the aspects of the present disclosure, it is possible to reduce occurrence of electrolytic corrosion in an area where a metal material and a dissimilar material overlap each other.

DETAILED DESCRIPTION

Embodiments of the present invention will be described below with reference to the drawings. Note that the following description of preferred embodiments is merely an example in nature, and is not intended to limit the scope, applications, or use of the present invention.

First Embodiment

Figure 1:
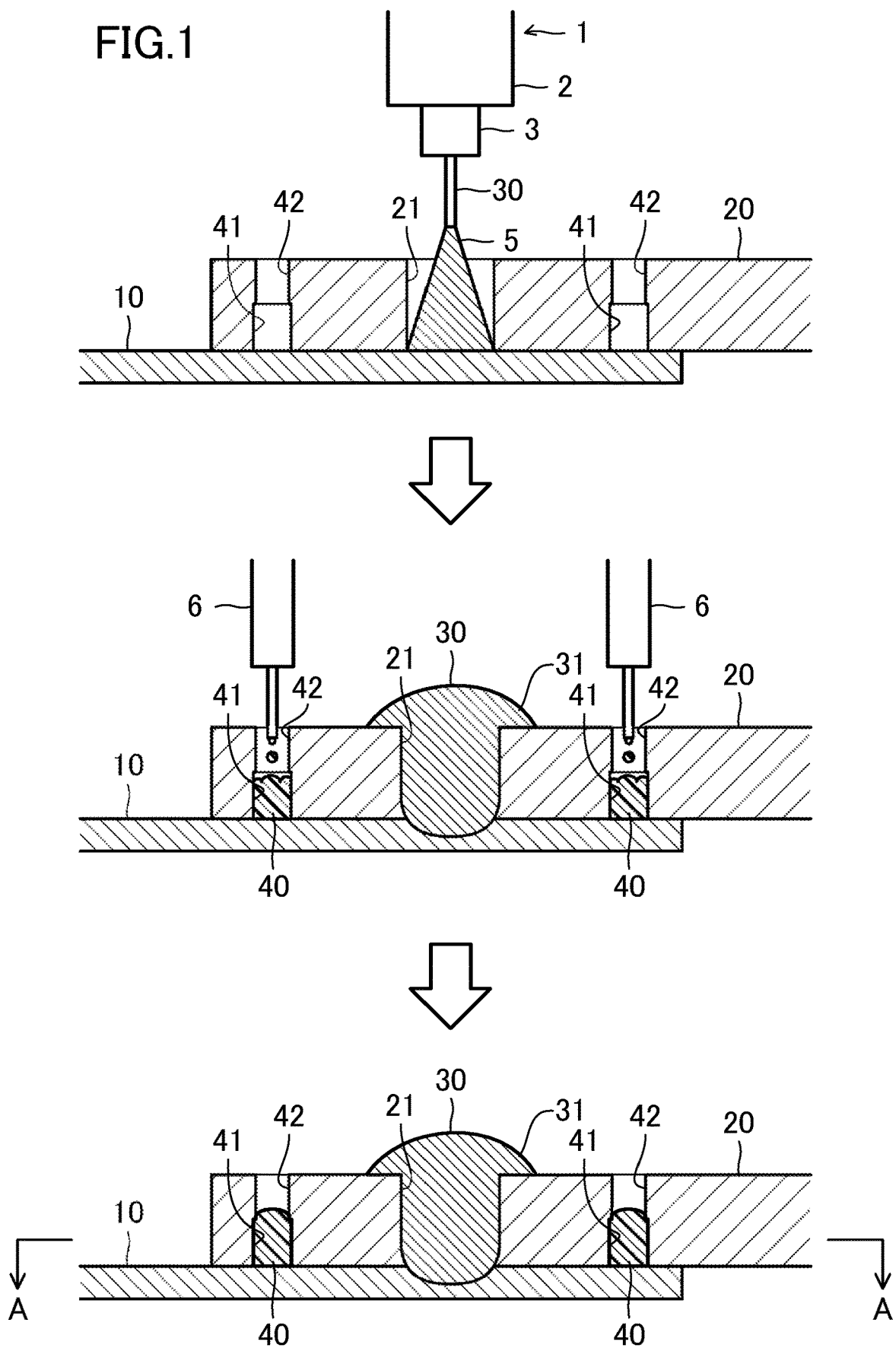
FIG. 1 is a side cross-sectional view for illustrating a joint structure according to a first embodiment.

FIG. 1 shows a joint structure for joining together a first member 10 made of a metal material, a second member 20 made of a material that is difficult to be welded to the first member 10, and a third member 30 made of a filler material.

The first member 10 is a plate-shaped member made of the metal material.

The second member 20 is a plate-shaped member made of the material that is difficult to be welded to the first member 10. The second member 20 is arranged to overlap with an upper side of the first member 10. The second member 20 has a circular through-portion 21 penetrating toward the first member 10.

In the present embodiment, the through-portion 21 is described as a circular through-hole, but may be an elliptical or elongated through-hole.

The second member 20 has a recess 41. The recess 41 is formed in the overlapped surface of the second member 20 with the first member 10. The recess 41 is formed into a space separate from the through-portion 21 and is recessed so as to surround the entire periphery of the through-portion 21. The recess 41 is formed into a space separate from a welded part that is a welding site where the first member 10 and the third member 30 are welded together. The recess 41 is recessed so as to surround the entire periphery of the welded part. The first member 10 is arranged so as to close a lower opening of the recess 41.

The second member 20 has an injection hole 42. The injection hole 42 communicates with the recess 41. A plurality of the injection holes 42 (four injection holes in an example shown in FIG. 2) are disposed along the recess 41.

The recess 41 is provided with a sealing material 40. The sealing material 40 is, for example, a resin material or an adhesive, and is injected into the recess 41 from the injection holes 42 using a dispenser 6. After being injected into the recess 41, the sealing material 40 is cured and closes a gap between overlapped surfaces of the first member 10 and the second member 20.

Figure 2:
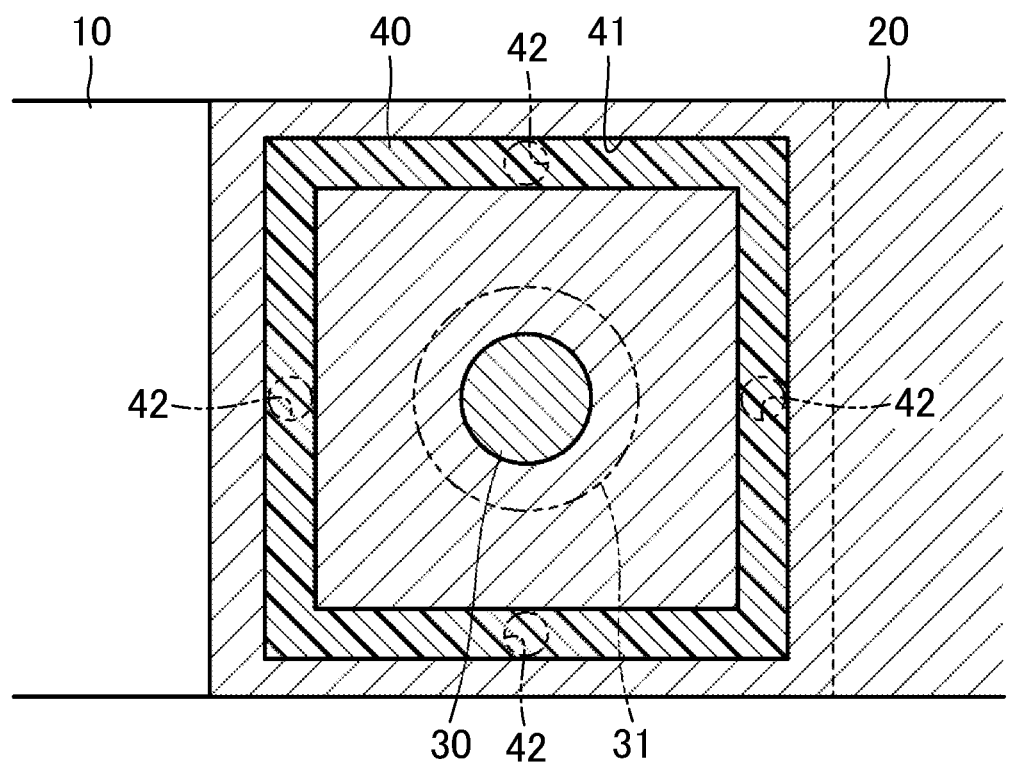
FIG. 2 is a cross-sectional view taken along the arrows A-A of FIG. 1.

In an example shown in FIG. 2, the recess 41 is formed in a rectangular frame shape in a plan view. The injection holes 42 are formed in the middle positions of respective four sides of the recess 41. The diameter of the injection hole 42 is substantially equal to a width of the recess 41. However, the number, positions, and sizes of the injection holes 42 may be set freely.

The third member 30 is made of a filler material that is a metal material of the same type as the metal material for the first member 10. The metal materials of the same type as used herein are metals that can be welded to each other, and are not only metal materials of an identical quality but also metal materials satisfactorily weldable to each other, such as ferrous metal materials or nonferrous metal materials. In other words, the metal materials of the same type are materials of the same type that are compatible with each other in welding.

Specifically, examples of a combination of the first member 10 and the third member 30 for welding include the following. For example, combinations of ferrous metal materials include mild steel and mild steel, stainless steel and stainless steel, mild steel and high-tensile steel, high-tensile steel and high-tensile steel, etc. Examples of combinations of nonferrous metal materials include aluminum and aluminum, aluminum and aluminum alloy, aluminum alloy and aluminum alloy, etc.

The second member 20 as a dissimilar material is a material of different quality from the quality of the first member 10 and the third member 30 as metal materials of the same type, and is difficult to be welded to the first member 10 and the third member 30.

For example, when the first member 10 and the third member 30 as metal materials of the same type are ferrous metal materials, the second member 20 as a dissimilar material is a nonferrous metal material such as a copper material or an aluminum material. For example, resin materials such as carbon fiber reinforced plastics (CFRP), polyethylene terephthalate (PET), and engineering plastics are also included as dissimilar materials from the metal materials.

In the following description, a mild steel material is used as the first member 10; an aluminum material is used as the second member 20; and a mild steel material is used as the third member 30 that is a filler material.

An arc welding machine 1 includes a nozzle 2 and a tip 3. The nozzle 2 supplies a shielding gas or the like to a welding site of a welding target. The tip 3 supplies a welding current to the third member 30.

The arc welding machine 1 supplies a welding current while feeding the third member 30 into the through-portion 21 of the second member 20, thereby generating an arc 5 between the third member 30 and the first member 10. The third member 30 melted by the arc welding is melt-bonded to the first member 10 and is laminated in the through-portion 21. Then, the melted third member 30 fills the through-portion 21 up, flows out to an upper peripheral edge of the through-portion 21, and spreads in a flange shape.

In a process in which the melted third member 30 becomes a bead, the third member 30 is provided with a flange 31 that presses the peripheral edge of the through-portion 21 of the second member 20. The flange 31 projects radially outward from the through-portion 21 on a surface (an upper surface in FIG. 1) of the second member 20 facing opposite to the first member 10.

Thereafter, the third member 30 is solidified and contracted on the first member 10, whereby the second member 20, which is a dissimilar material, is compressed and fixed between the flange 31 and the first member 10.

Next, using the dispenser 6, the sealing material 40 is injected into the recess 41 from the plurality of the injection holes 42. In one preferred embodiment, the sealing material 40 is injected in such an amount that the sealing material 40 fills an inside of the recess 41 and then overflows into the injection holes 42. This allows the sealing material 40 to spread all around and throughout the recess 41. Further, simultaneously injecting the sealing material from the plurality of the injection holes 42 makes it possible to perform the injection of the sealing material 40 in a short time.

Thereafter, the sealing material 40 is cured inside the recess 41 and hence closes the gap between the overlapped surfaces of the first member 10 and the second member 20. When the sealing material 40 is charged into the recess 41, some of the plurality of the injection holes 42 may be used as air vent holes depending on viscosity of the sealing material 40. In a process of injecting the sealing material 40 into the recess 41, air remaining inside the recess 41 is discharged from some of the injection holes 42 functioning as air vent holes. This allows the recess 41 to be efficiently filled with the sealing material 40.

In one preferred embodiment, in addition to the injection hole 42 for injecting the sealing material 40, an injection hole 42 for discharging air remaining inside the recess 41 is provided.

In a case where the sealing material 40 is injected into the recess 41 from the plurality of the injection holes 42, an air vent hole (not shown) may be provided in addition to the injection holes 42 to efficiently discharge air remaining inside the recess 41 in the process of injecting the sealing material 40 into the recess 41. This allows the recess 41 to be filled with the sealing material 40 while the air remaining inside the recess 41 is efficiently discharged. This makes it possible to shorten time taken to fill the recess 41 with the sealing material 40.

Some of the plurality of injection holes 42 for injecting the sealing material 40, more specifically, at least some of the plurality of the injection holes 42 located in between the plurality of injection holes 42, may be used as holes for discharging air inside the recess 41. According to this configuration, when the sealing material 40 is charged from a plurality of the injection holes 42 at the same time, the air inside the recess 41 can be efficiently discharged from the injection holes 42 not injecting the sealing material 40 and located between the plurality of injection holes 42.

As described above, according to the joint structure of the present embodiment, the recess 41 is formed into a space separate from the welded part, which is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The gap between the overlapped surfaces of the first member 10 and the second member 20 is closed with the sealing material 40. It is therefore possible to keep moisture from entering from the outside into an area where the first member 10 and the second member 20 overlap each other.

This makes it possible to reduce occurrence of electrolytic corrosion in the area where the first member 10 and the second member 20 overlap each other around the welded part, which is a welding site where the first member and the third member are welded together, and to secure joining strength.

In addition, since the sealing material 40 is injected after the second member 20 is compressed and fixed by solidification and contraction of the third member 30 on the first member 10, the sealing material 40 is not deformed, nor part of the sealing material 40 evaporates or generates gas, due to heat during welding. This allows the sealing material 40 to spread all around and throughout the recess 41 and improve sealing properties.

Second Embodiment

In the following description, the same reference characters designate the same components as those of the first embodiment, and the description is focused only on differences between this embodiment and the first embodiment.

Figure 3:
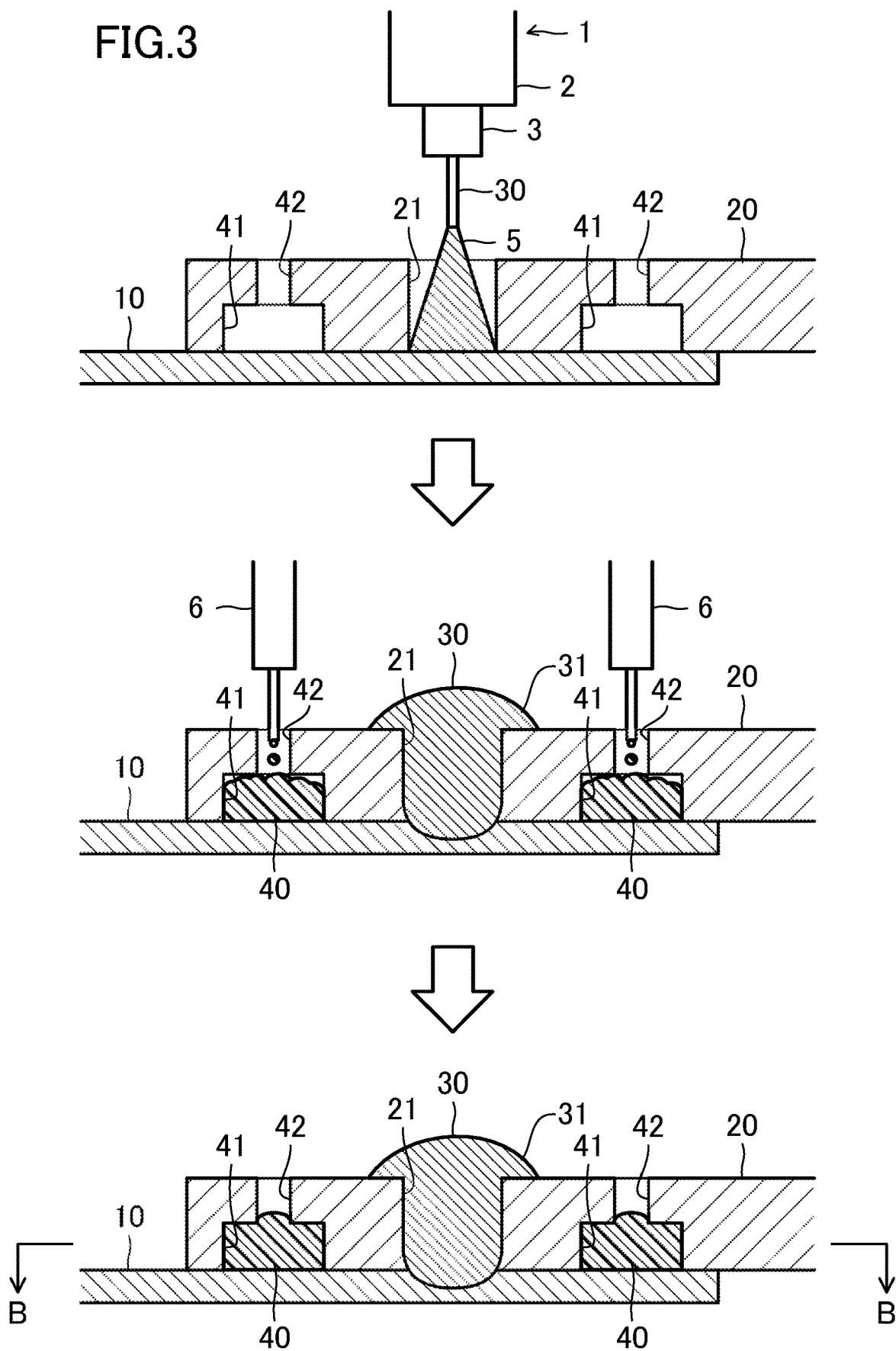
FIG. 3 is a side cross-sectional view for illustrating a joint structure according to a second embodiment.

As shown in FIG. 3, a second member 20 has a recess 41. The recess 41 is formed in the overlapped surface of the second member 20 with the first member 10. The recess 41 is formed into a space separate from the through-portion 21 and is recessed so as to surround the entire periphery of the through-portion 21. The recess 41 is formed into a space separate from a welded part that is a welding site where the first member 10 and the third member 30 are welded together. The recess 41 is recessed so as to surround the entire periphery of the welded part. The first member 10 is arranged so as to close a lower opening of the recess 41.

The second member 20 has an injection hole 42. The injection hole 42 communicates with the recess 41. A plurality of the injection holes 42 (eight injection holes in an example shown in FIG. 4) are disposed along the recess 41. The injection holes 42 are formed into a space separate from the welded part, which is a welding site where the first member 10 and the third member 30 are welded together.

The recess 41 is provided with a sealing material 40. The sealing material 40 is injected into the recess 41 from the injection holes 42 using a dispenser 6. After being injected into the recess 41, the sealing material 40 is cured and closes a gap between overlapped surfaces of the first member 10 and the second member 20.

Figure 4:
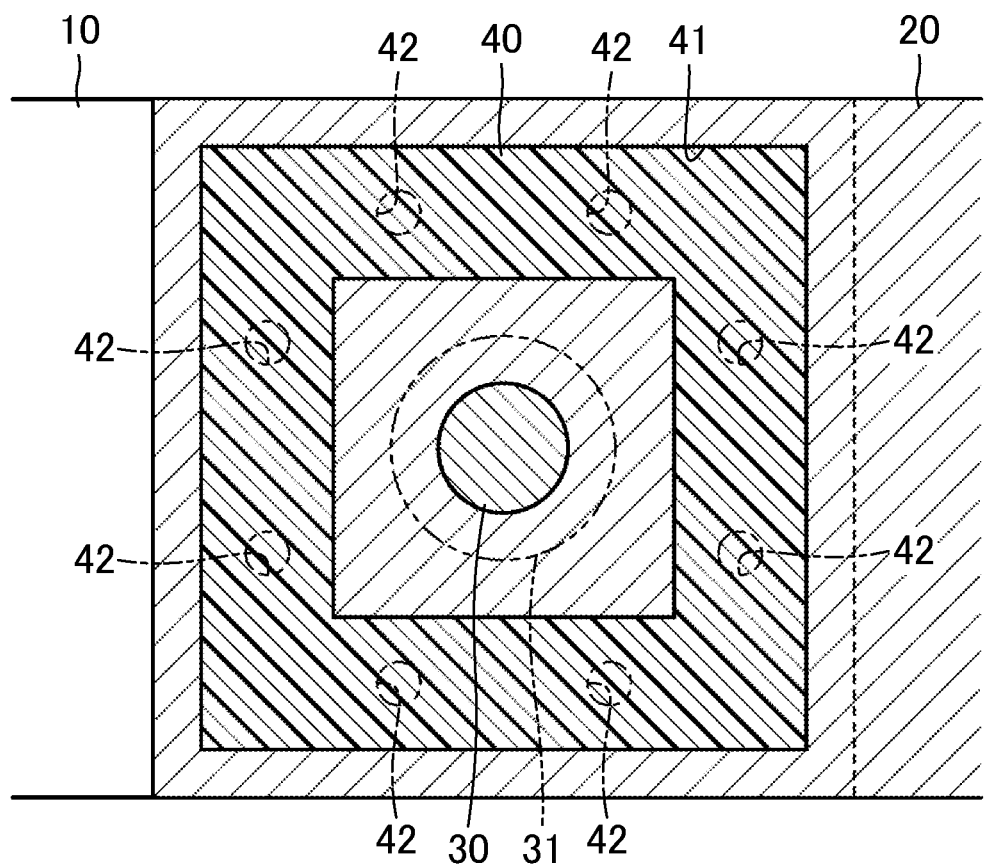
FIG. 4 is a cross-sectional view taken along the arrows B-B of FIG. 3.

In an example shown in FIG. 4, the recess 41 is formed in a rectangular frame shape in a plan view. Two injection holes 42 are formed in each of four sides of the recess 41. That is, eight injection holes 42 are formed along the recess 41. The width of the recess 41 is larger than the diameter of the injection hole 42. However, the number, positions, and sizes of the injection holes 42 may be set freely.

As shown in FIG. 3, when the sealing material 40 is injected into the recess 41 from the plurality of the injection holes 42 using the dispenser 6, the sealing material 40 spreads circumferentially and transversely inside the recess 41. Thereafter, the sealing material 40 is cured inside the recess 41 and hence closes the gap between the overlapped surfaces of the first member 10 and the second member 20.

This allows the sealing material 40 to be installed over an increased area inside the recess 41, which improves sealing properties.

Third Embodiment

Figure 5:
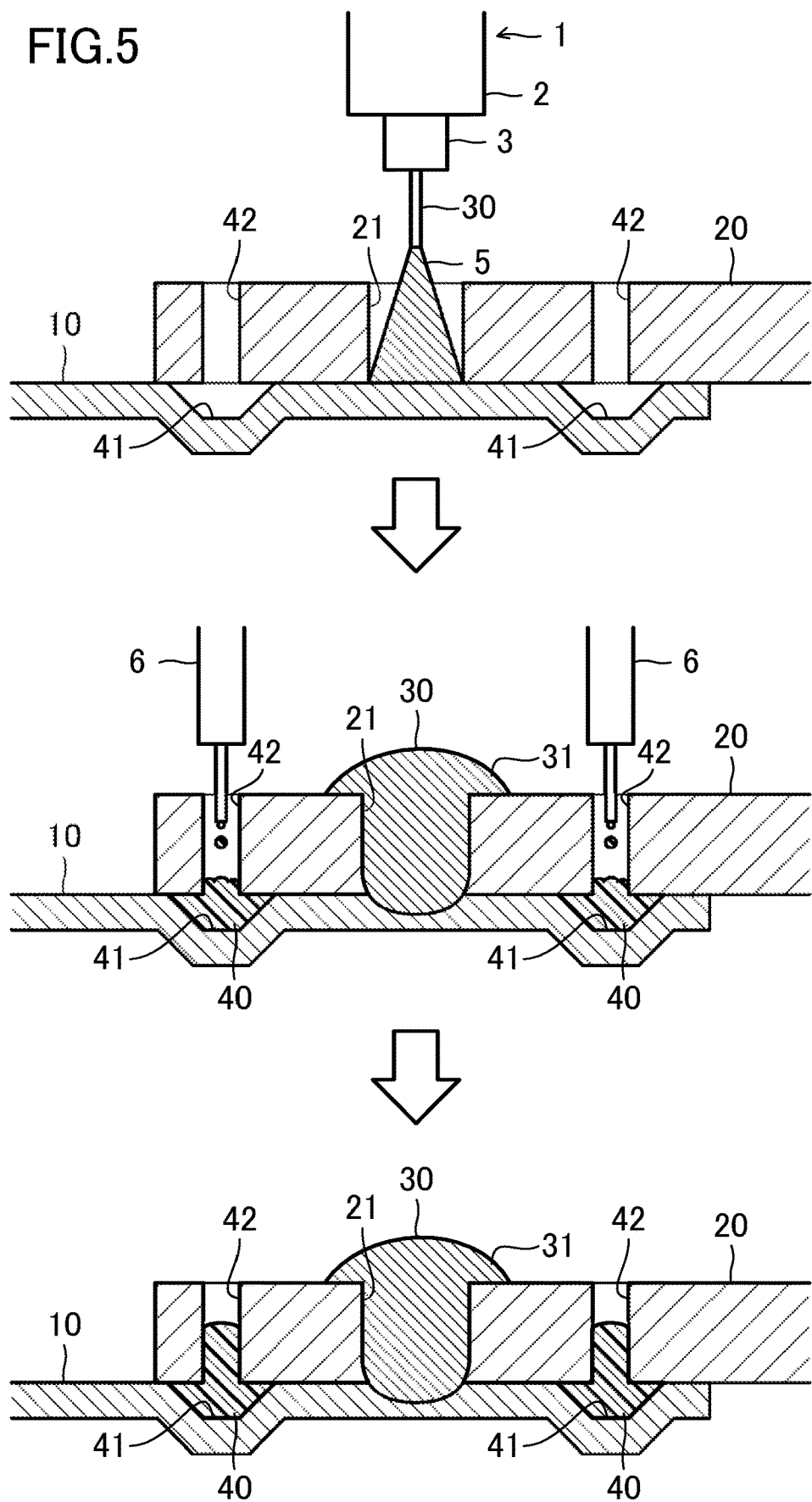
FIG. 5 is a side cross-sectional view for illustrating a joint structure according to a third embodiment.

As shown in FIG. 5, a first member 10 has a recess 41. The recess 41 is formed in the overlapped surface of the first member 10 with a second member 20. The recess 41 is formed by press-forming the first member 10 having a smaller plate thickness than the second member 20 to be plastically deformed into a three-dimensional shape. The recess 41 is recessed downward in a stepped shape. The recess 41 is formed into a space separate from the through-portion 21 and is recessed so as to surround the entire periphery of the through-portion 21.

The second member 20 is disposed so as to close an upper opening of the recess 41. The second member 20 has an injection hole 42. The injection hole 42 communicates with the recess 41. A plurality of the injection holes 42 are disposed along the recess 41. The width of the recess 41 is larger than the diameter of the injection hole 42. However, the number, positions, and sizes of the injection holes 42 may be set freely.

When the sealing material 40 is injected into the recess 41 from the plurality of the injection holes 42 using a dispenser 6, the sealing material 40 spreads circumferentially and transversely inside the recess 41. Thereafter, the sealing material 40 is cured inside the recess 41 and hence closes the gap between the overlapped surfaces of the first member 10 and the second member 20.

The strength of the first member 10, which has a smaller plate thickness than the second member 20, is increased by the recess 41 formed in the stepped shape in the first member 10.

The recess 41 is formed into a space separate from a welded part that is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. This enables the joint structure to keep moisture from entering from the outside into an area where the first member 10 and the second member 20 overlap each other. It is therefore possible to reduce occurrence of electrolytic corrosion in the area where the first member 10 and the second member 20 overlap on each other and to secure joining strength.

Fourth Embodiment

Figure 6:
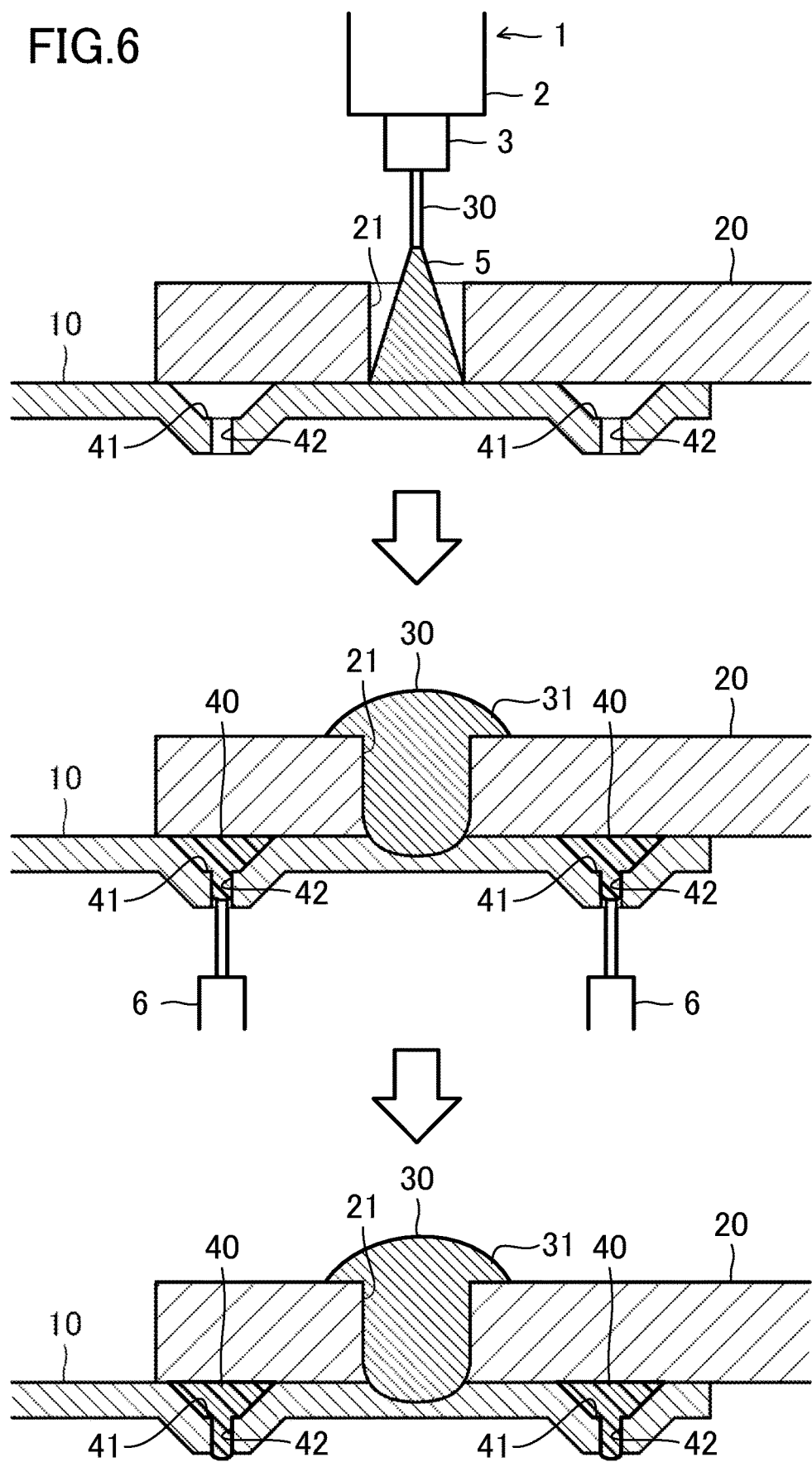
FIG. 6 is a side cross-sectional view for illustrating a joint structure according to a fourth embodiment.

As shown in FIG. 6, a first member 10 has a recess 41. The recess 41 is formed in the overlapped surface of the first member 10 with a second member 20. The recess 41 is formed by press-forming the first member 10 having a smaller plate thickness than the second member 20 to be plastically deformed into a three-dimensional shape. The recess 41 is recessed downward in a stepped shape. The recess 41 is formed into a space separate from the through-portion 21 and is recessed so as to surround the entire periphery of the through-portion 21. The second member 20 is disposed so as to close an upper opening of the recess 41.

The first member 10 has an injection hole 42. The injection hole 42 is formed into a space separate from a welded part that is a welding site where the first member 10 and a third member 30 are welded together. The injection hole 42 communicates with the recess 41. A plurality of the injection holes 42 are disposed along the recess 41. The width of the recess 41 is larger than the diameter of the injection hole 42. However, the number, positions, and sizes of the injection holes 42 may be set freely.

When the sealing material 40 is injected into the recess 41 from the plurality of the injection holes 42 using a dispenser 6, the sealing material 40 spreads circumferentially and transversely inside the recess 41. Thereafter, the sealing material 40 is cured inside the recess 41 and hence closes the gap between the overlapped surfaces of the first member 10 and the second member 20.

The strength of the first member 10, which has a smaller plate thickness than the second member 20, is increased by the recess 41 formed in the stepped shape in the first member 10.

The recess 41 is formed into a space separate from a welded part that is a welding site where the first member 10 and the third member 30 are welded together. The sealing material 40 is injected into a vertical injection path for the sealing material 40 and a lateral communication path. The vertical injection path is formed in the first member 10 as a part of the recess 41. The lateral communication path is recessed so as to surround the entire periphery of the through-portion 21. The sealing material 40 closes the gap between the overlapped surfaces of the first member 10 and the second member 20, thereby improving sealing properties. This enables the joint structure to keep moisture from entering from the outside into an area where the first member 10 and the second member 20 overlap each other. It is therefore possible to reduce occurrence of electrolytic corrosion in the area where the first member 10 and the second member 20 overlap on each other and to secure joining strength.

Other Embodiments

The embodiments described above may be modified as follows.

In the present embodiments, arc welding is performed on the recess 41 in the first member 10. However, for example, so-called laser filler welding may be performed in which laser welding is performed using a filler wire as a filler material.

In the present embodiments, the recess 41 is formed in the first member 10 or the second member 20, but the recess 41 may be formed in each of the first member 10 and the second member 20.

To discharge air remaining inside the recess 41 in the process of injecting the sealing material 40 into the recess 41 from the injection holes 42, an air vent hole (not shown) may be provided in addition to the injection holes 42, or some of the plurality of injection holes 42 may be used to function as an air vent hole. However, these forms are not construed to limit the scope of the present invention.

For example, the recess 41 is formed into a space separate from the through-portion 21. The recess 41 is formed into a space separate from the welded part, which is a welding site where the first member 10 and the third member 30 are welded together. The recess 41 is recessed so as to surround the entire peripheries of the welded part and the through-portion 21. A part of the recess 41 communicating all around the outer periphery of the through-portion 21 may communicate with, and be open to, a side face on the outer periphery of the overlapped surfaces of the first member 10 and the second member 20, and this opening may serve as an air vent hole for discharging the air from the recess 41.

As can be seen from the foregoing description, the present invention can produce a highly practical effect of being able to reduce occurrence of electrolytic corrosion in an area where a metal material and a dissimilar material overlap each other, and is therefore very useful and offers high industrial applicability.

What is claimed is:

1. A joint structure including a first member made of a metal material, a second member made of a material that is difficult to be welded to the first member, and a third member made of a filler material and welded to the first member, the first member, the second member, and the third member being joined together,
the second member including a through-portion penetrating toward the first member,
the third member being welded to the first member through the through-portion,
at least one of overlapped surfaces of the first member and the second member including a recess formed into a space separate from the through-portion, the recess being recessed so as to surround an entire periphery of the through-portion,
the recess being formed into a space separate from a welded part that is a welding site where the first member and the third member are welded together, the recess being recessed so as to surround an entire periphery of the welded part,
at least one of the first member or the second member including an injection hole communicating with the recess, and
the recess being provided with a sealing material injected from the injection hole, the sealing material closing a gap between the overlapped surfaces of the first member and the second member.

2. The joint structure of claim 1, wherein
the injection hole includes a plurality of injection holes, the injection holes being disposed along the recess.

3. The joint structure of claim 1, wherein
the recess has a width larger than a diameter of the injection hole.

4. The joint structure of claim 1, wherein
the recess is formed in the first member having a smaller plate thickness than the second member, the recess being obtained by plastically deforming the first member into a three-dimensional shape.

5. A joining method for joining together a first member made of a metal material, a second member made of a material that is difficult to be welded to the first member, and a third member made of a filler material and welded to the first member,
the second member including a through-portion penetrating toward the first member,
at least one of overlapped surfaces of the first member and the second member including a recess formed into a space separate from the through-portion, the recess being recessed so as to surround an entire periphery of the through-portion,
the recess being formed into a space separate from a welded part that is a welding site where the first member and the third member are welded together, the recess being recessed so as to surround an entire periphery of the welded part,
at least one of the first member or the second member including an injection hole communicating with the recess,
the joining method comprising:
overlapping the second member on the first member and welding the third member to the first member through the through-portion; and
injecting a sealing material into the recess from the injection hole to close a gap between the overlapped surfaces of the first member and the second member with the sealing material.

6. The joining method of claim 5, wherein
the recess is formed in the first member having a smaller plate thickness than the second member, the recess being obtained by plastically deforming the first member into a three-dimensional shape.

* * * * *